United States Patent [19]

Nakata et al.

[11] Patent Number: 4,602,252

[45] Date of Patent: Jul. 22, 1986

[54] METHOD AND DEVICE FOR DATA COMMUNICATION

[75] Inventors: Yukio Nakata, Kawasaki; Kaoru Suda, Ohmiya, both of Japan

[73] Assignees: Hitachi, Ltd.; Yagi Antenna Co., Ltd., both of Tokyo, Japan

[21] Appl. No.: 454,030

[22] Filed: Dec. 28, 1982

[30] Foreign Application Priority Data

Jan. 8, 1982 [JP] Japan ................................. 57-950

[51] Int. Cl.⁴ ........................ H04Q 9/00; H04N 15/00
[52] U.S. Cl. ..................................... 340/825.5; 178/3
[58] Field of Search ...................... 340/825.5; 178/3; 370/85, 94

[56] References Cited

U.S. PATENT DOCUMENTS

| | | | |
|---|---|---|---|
| 4,234,952 | 11/1980 | Gable et al. | 340/825.5 |
| 4,271,507 | 6/1981 | Gable et al. | 370/94 |
| 4,292,623 | 9/1981 | Eswaran et al. | 178/3 |
| 4,384,363 | 5/1983 | Lipcon | 340/825.5 |
| 4,409,592 | 10/1983 | Hunt | 340/825.5 |
| 4,432,088 | 2/1984 | Frankel | 340/825.5 |
| 4,463,351 | 7/1984 | Chiarottino | 340/825.5 |
| 4,466,096 | 8/1984 | Heins et al. | 340/825.5 |

Primary Examiner—Donald J. Yusko
Attorney, Agent, or Firm—Antonelli, Terry & Wands

[57] ABSTRACT

A method for data communication usable for a system having a common transmission line, a plurality of transceivers connected to the common transmission line, and a data processing equipment connected to each of the transceivers, the system being arranged such that data from the data processing equipment is sent to the common transmission line through the corresponding transceiver, while data from the common transmission line is sent to the data processing equipment through the corresponding transceiver, thereby effecting a data communication between data processing equipment, wherein when a request to send data is sent from the data processing equipment to the corresponding transceiver, a carrier signal is sent to the common transmission line, and when the fact that no data is sent from any of the other transceivers to the common transmission line is detected during a given period of time after the sending of the carrier signal, the transceiver gives a permission to send data, to the corresponding data processing equipment, which then sends data on the permission. Also disclosed is a device for carrying out the above-mentioned method for data communication.

6 Claims, 6 Drawing Figures

METHOD AND DEVICE FOR DATA COMMUNICATION

BACKGROUND OF THE INVENTION

1. Field of the Invention

The present invention relates to a method and device for data commmunication usable for communication of data between terminals, computers or the like installed as an in-house distributed processing system.

2. Description of the Prior Art

Owing to the spread of in-house distributed processing, a data communication method has been widely employed in which a large number of terminals and computers are installed as an in-house distributed processing system and communication is carried out among them.

The method is such that a coaxial cable is employed as a transmission line and the signals sent through the coaxial cable are led to a terminal or a computer provided in each of the rooms through a transceiver, signal line and connector provided for each room, thereby carrying out data communication.

In this case, there are provided a carrier sense line, contention detect line, data send line and data receive line, as the interface between the transceivers and the terminals or the computers (referred to as "data processing equipment" hereinafter). The carrier sense line is in the "1" state when another transceiver is sending data on the coaxial cable, but is in the "0" state in other cases. The contention detect line is in the "1" state when another transceiver attempts to send data at the same time when the data processing equipment is sending data, but is in the "0" state in other cases. The data send line is used when the data processing equipment sends data. On the other hand, the data receive line is used when the data processing equipment receives data.

Employing this interface, the conventional method allows data to be transferred as follows.

Any one of the data processing equipment can start the sending of data through the data send line when the carrier sense line is in the "0" state. The data is sent to the coaxial cable by means of the corresponding transceiver. The data is transferred to the coaxial cable with a propagation delay and received by another transceiver, which brings the carrier sense line into the "1" state for showing that the coaxial cable is being used. However, owing to the propagation delay, when the carrier sense line of the second-mentioned transceiver is in the "0" state even after the first-mentioned transceiver has started data sending, there are cases where the data processing equipment connected to the second-mentioned transceiver starts data sending. In such cases, the first-mentioned transceiver detects the contention and brings the contention detect line into the "1" state. When the contention detect line is brought into the "1" state, the data processing equipment connected to the first-mentioned transceiver suspends the data sending and starts sending of the same data on confirmation that the carrier sense line is in the "0" state after the elapse of a time determined according to random numbers.

In such a system, when the carrier sense line is judged to be in the "0" state, i.e., when the coaxial cable is judged to be not used, data is immediately sent. Therefore, in case of occurrence of contention, the data sending must be stopped halfway and moreover, there is a need for such a troublesome processing that the data must be sent once more from the top thereof.

Furthermore, since transmission is once closed when contention occurs, it is not always possible for the data processing equipment having been made to close transmission, to resume data sending with priority to the others after the contention is removed, and there may be cases where another data processing equipment which attempts to start transmission starts data sending prior to the data processing equipment having been suspended because of contention.

SUMMARY OF THE INVENTION

It is, therefore, an object of the present invention to provide a method and device for data communication capable of preventing contention from causing an interruption of data sending while a data processing equipment is sending data.

To this end, according to the invention, there are provided a request-to-send line and a clear-to-send line between the data processing equipment and the transceiver corresponding thereto, whereby prior to data sending the data processing equipment brings the request-to-send line into the "1" state, and when the request-to-send line is in the "1" state, the transceiver first sends a carrier signal, and when there is no contention on watch for a given period of time, the transceiver brings the clear-to-send line into the "1" state for permitting the data processing equipment to start data sending.

DETAILED DESCRIPTION OF THE PREFERRED EMBODIMENTS

One preferred embodiment of the invention will be described hereinunder in greater detail with reference to the accompanying drawings.

Figure 1:
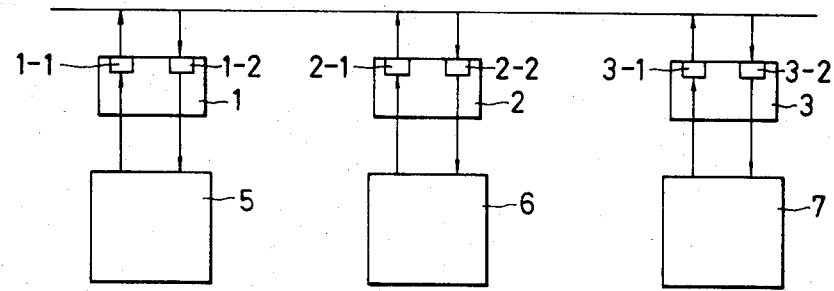
FIG. 1 illustrates the arrangement of a method and device for data communication in accordance with one preferred embodiment of the invention.

FIG. 1 shows a method and device for data communication in accordance with one preferred embodiment of the invention.

In the Figure, transceivers 1, 2 and 3 are connected to a coaxial cable 4 as well as data processing equipment 5, 6 and 7 each comprising a terminal such as a display terminal or a computer, respectively. The transceivers 1 to 3 are provided with modulators 1-1 to 3-1 and demodulators 1-2 to 3-2, respectively.

In such an arrangement, the transceivers 1 to 3 receive data sent from the data processing equipment 5 to 7 connected thereto, modulate the data by means of the modulators 1-1 to 3-1 and send them to the coaxial cable 4, respectively. Moreover, the transceivers 1 to 3 receive the data sent through the coaxial cable 4, demodulate the data by means of the demodulators 1-2 to 3-2 and deliver it to the data processing equipment 5 to 7.

Figure 2:
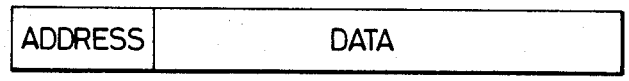
FIG. 2 illustrates an example of the arrangement of data to be sent in accordance with the invention.

FIG. 2 shows the arrangement of the data to be sent, to which the destination address is added besides the essential data. Since each of the data processing equipment 5 to 7 receives only the data addressed thereto, data communication can be effected between any data processing equipment.

Figure 3:
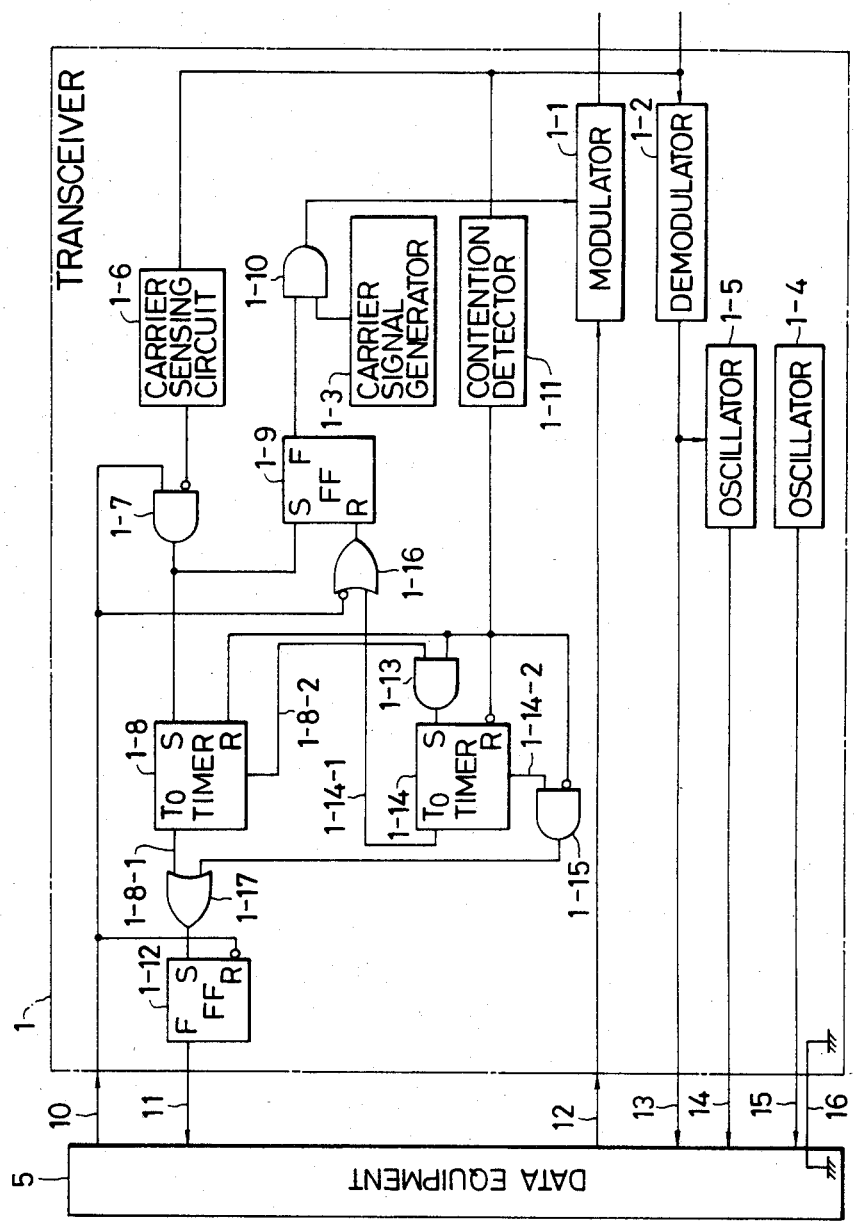
FIG. 3 practically illustrates an example of the transceiver part of the arrangement shown in FIG. 1.

FIG. 3 shows a practical arrangement of each of the transceivers shown in FIG. 1 and an example of connection with the corresponding data processing equipment, such as a terminal. The transceiver has a function to avoid contention occurring when a plurality of terminals or the like attempt to send data at the same time.

It is to be noted that FIG. 3 shows one example of the transceiver 1.

In FIG. 3, first, an interface signal line between the data processing equipment 5 and the transceiver 1 will be described hereinunder.

When the data processing equipment 5 wants to send data, the signal (referred to as "request-to-send signal" hereinafter) of a request-to-send line 10 is made "1" (ON). The transceiver 1 makes the signal (referred to as "clear-to-send signal" hereinafter) of a clear-to-send line 11 be "1" when the request-to-send signal from the data processing equipment 5 is "1" and moreover when it is possible to send data, as described later in detail.

The data processing equipment 5 sends a send data (sequence of bits "1", "0") to a send data line 12 while the clear-to-send signal is "1". In the transceiver 1, the modulator 1-1 modulates a carrier signal generated by a carrier signal generator 1-3 according to the send data, and sends the modulated signal to the coaxial cable 4. On the other hand, the data received through the coaxial cable 4 is demodulated by means of the demodulator 1-2 and sent to the data processing equipment 5 through a receive data line 13.

In the transceiver 1, a timing signal for transmission of the send data is generated by means of an oscillator 1-4 and sent to the data processing equipment 5 through a send clock line 15. Moreover, an oscillator 1-5 is started at the change point of the bit of the data received through coaxial cable 4 from "0" to "1" in order to form such a receive data sampling clock as to generate a sampling clock pulse at the middle point between the bits of the receive data, and the sampling clock pulse is sent to the data processing equipment 5 through a receive clock line 14. It is to be noted that a common ground line 16 functions as a fly-back line common to interface signal lines 10 to 15.

Next, the operation in data sending and receiving between the data processing equipment 5 to 7 will be described hereinunder in detail in conjunction with the case where data is sent from the data processing equipment 5 to the data processing equipment 6.

Each of the data processing equipment 5 to 7 has an address peculiar thereto. The data sent from the data processing equipment 5 to the data processing equipment 6 has at its top an address ADDRESS peculiar to the data processing equipment 6 followed by data DATA per unit (referred to as a "bucket"), as shown in FIG. 2.

The transceiver 1 examines whether there is an input from the coaxial cable 4 or not, by means of a carrier sensing circuit 1-6. When there is no input, i.e., when no other transceiver is transmitting, the output of the carrier sensing circuit 1-6 is made "0" (OFF). On the other hand, when there is an input from the coaxial cable 4, i.e., when another transceiver is transmitting, the output of the carrier sensing circuit 1-6 is made "1".

The data processing equipment 5 makes the signal of the request-to-send line 10 become "1" prior to data sending.

In the transceiver 1, when the request-to-send signal is "1" and moreover the output of the carrier sensing circuit 1-6 is "0", an AND gate 1-7 is opened in order to start a timer 1-8. In addition, a flip-flop 1-9 is set, and an AND gate 1-10 is opened by means of the output of the flip-flop 1-9 in order to feed the output of the carrier signal generator 1-3 to the modulator 1-1. The modulator 1-1 sends the carrier signal to the coaxial cable 4 regardless of whether the data is sent from the data processing equipment 5 or not.

It is to be noted that the request-to-send signal is to hold the "1" state while data is being sent from a data processing equipment. Moreover, the value of the timer 1-8 is set so as to be a maximum data propagation delay time between any two transceivers.

While sending a carrier signal, the transceiver 1 checks for contention of carrier signals, i.e., whether or not another transceiver 2 or 3 is transmitting a carrier signal at the same time. The detection of contention is effected by means of a contention detector 1-11. The contention detector examines the magnitude of the input from the coaxial cable 4, and delivers "0" when the magnitude shows that a single transceiver (transceiver 1, 2 or 3) is transmitting, but delivers "1" when the magnitude is as large as that obtained when two or more transceivers are transmitting.

Figure 4A:
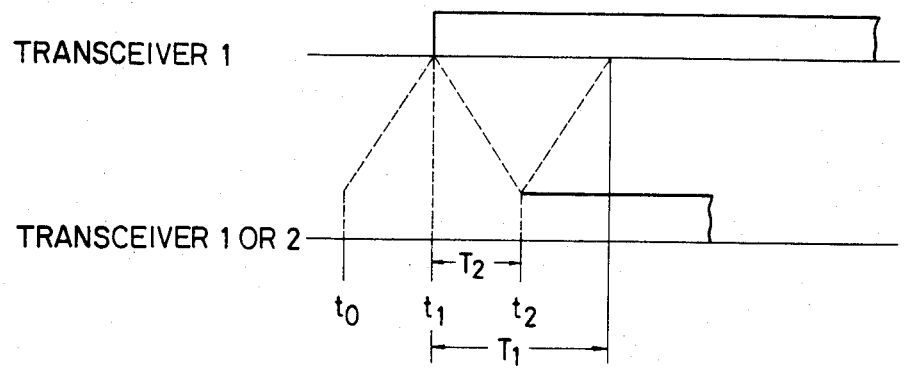
FIG. 4A and FIG. 4B are sequence charts for illustrating the operation of the circuit shown in FIG. 3, respectively.

As shown in FIG. 4A, the fact that no contention occurs during the period that a specified time $T_1$ set in the timer 1-8 passes after the starting of the transmission of a carrier signal at a time $t_1$ means that if the transceiver 1 starts the transmission of the carrier signal at the time $t_1$ and the transceiver 2 or 3 detects the transmission at a time $t_2$ owing to a propagation delay time $T_2$, the transceiver 2 or 3 has not sent any carrier signal before the time $t_2$, and moreover, the transceivers 2 and 3 have already detected that the transceiver 1 started sending the carrier signal. In such a case, a time-out output 1-8-1 of the timer 1-8 becomes "1" after the specified period $T_1$ elapses, causing a flip-flop 1-12 to be set, thereby allowing the signal of the clear-to-send line 11 to be "1".

After sending a clear-to-send response, the transceiver 1 continues transmitting the carrier signal until data is sent thereto from the data processing equipment 5 through the send data line 12 in order to prevent another transceiver 2 or 3 from starting transmission. When receiving the data sent from the data processing equipment 5, the modulator 1-1 modulates the carrier signal in accordance with the data and starts transmitting the modulated carrier signal to the coaxial cable 4.

It is to be noted that the specified time $T_1$ should be a period of time needed for data to reciprocate between the transceivers most separate from each other.

In FIG. 4A, contention occurs if the transceiver 2 or 3 starts transmission of a carrier signal between $t_0$ and $t_2$ around when the transceiver 1 starts transmission of a carrier signal. In the transceiver 1, when the timer 1-8 is in an operative state, an in-operation output 1-8-2 is "1". If contention occurs then, the output of the contention detector 1-11 becomes "1", causing an AND gate 1-13 to be opened, thereby starting a timer 1-14. Moreover, the timer 1-8 is reset.

The transceiver 1 continuously transmits the carrier signal in order to detect the fact that there is no more contention.

The value set in the timer 1-14 is determined according to random numbers every time this timer starts, thereby preventing the same timer set time from being set in the transceivers having contention with each other.

When the specified time set in the timer 1-14 passes with a contention state being maintained, a time-out output 1-14-1 becomes "1", causing the flip-flop 1-9 to be reset through an OR gate 1-16 for closing the AND gate 1-10, thereby suspending the transmission of the carrier signal. When the transmission is suspended, the output of the contention detector 1-11 becomes "0".

After the suspension of the carrier signal transmission, the transceiver 1 waits for the completion of the transmission being effected by another transceiver 2 or 3.

Figure 4B:
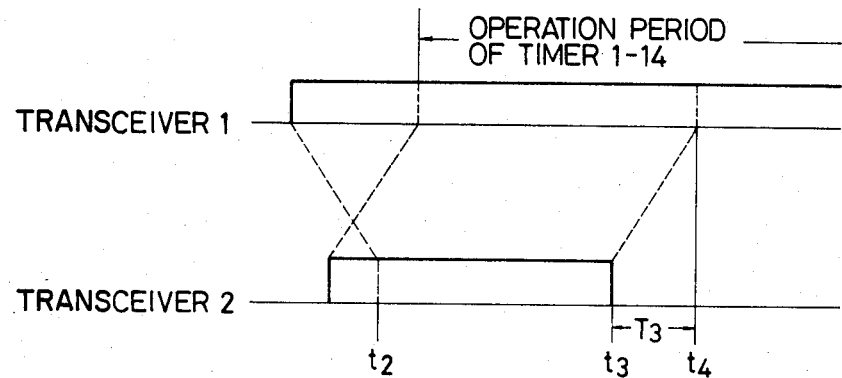

Assuming now that the transceivers 1 and 2 transmit carrier signals at almost the same time, causing contention, as shown in FIG. 4B. In such a case, if the transceiver 2 stops transmission of the carrier signal at a time $t_3$, contention is no longer detected in the transceiver 1 at a time $t_4$ at which a propagation delay time $T_3$ has passed. The operation inside the transceiver 1 is as follows.

When the timer 1-14 is in an operative state, the in-operation output 1-14-2 is "1". When the output of the contention detector 1-11 becomes "0" under this state, an AND gate 1-15 is opened, causing a flip-flop 1-12 to be set, thereby allowing the signal of the clear-to-send line 11 to be "1". Moreover, the timer 1-14 is reset. The operation thereafter is the same as the case of the time-out of the timer 1-8.

The fact that the request-to-send signal of the request-to-send line 10 is "1" and moreover the output of the carrier sensing circuit 1-6 is "1" means that another transceiver 2 or 3 is transmitting a carrier signal. Therefore, the transceiver 1 waits for the completion of the transmission.

Upon completion of the transmission effected by another transceiver, the output of the carrier sensing circuit 1-6 becomes "0", causing the AND gate 1-7 to be opened. The operation thereafter is the same as the operation carried out after the starting of the timer 1-8.

It is to be noted that in the embodiment described above, the timers 1-8 and 1-14 are adapted to change the outputs 1-8-2 and 1-14-2 from "1" to "0", respectively, with a little time delay after being reset.

Figure 5:
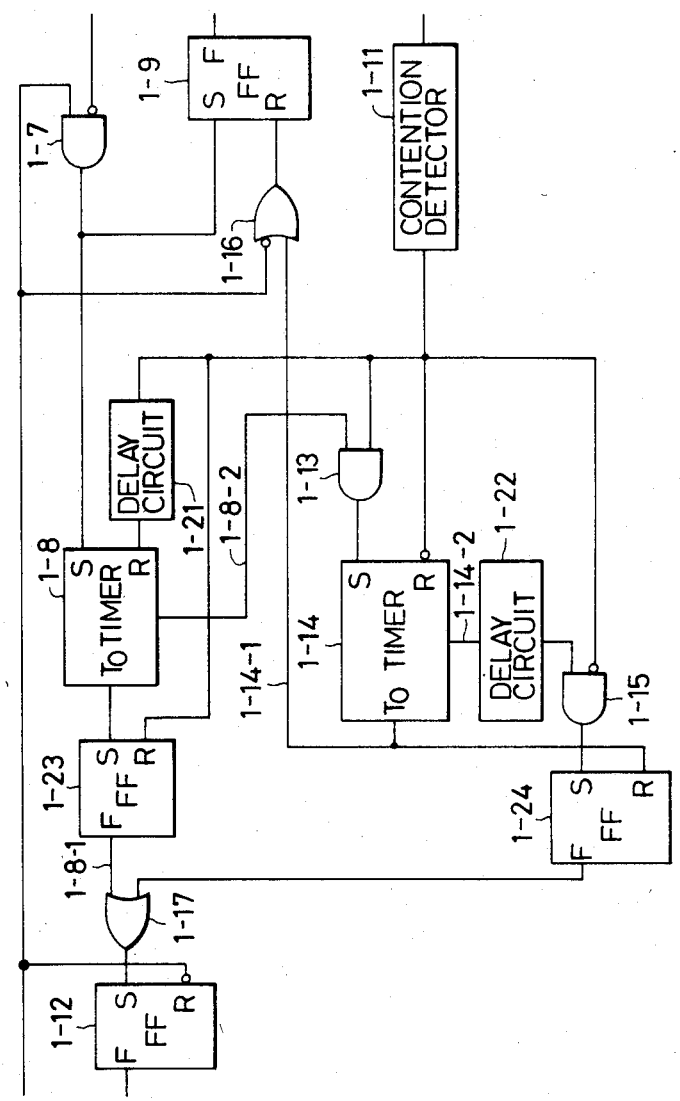
FIG. 5 practically illustrates another example of the transceiver part of the arrangement shown in FIG. 1.

FIG. 5 shows an essential part of another example of the transceiver 1 shown in FIG. 1.

The difference from the arrangement of the example shown in FIG. 3 is addition of delay circuits 1-21, 1-22 and flip-flop circuits 1-23, 1-24.

In these added circuits, the delay circuit 1-21 is a circuit for resetting the timer 1-8 on occurrence of contention; the flip-flop circuit 1-23, which is provided for compensation for the timing change due to the addition of the delay circuit 1-21, is a circuit for preventing the time-out of the timer 1-8 before it is reset thereby undesirably changing the clear-to-send signal to "1"; the delay circuit 1-22 is a circuit for changing the clear-to-send signal to "1" after the occurrence of contention owing to the interruption of transmission by others; and the flip-flop circuit 1-24 is a circuit for preventing the clear-to-send signal from becoming "1" after the time-out of the timer 1-14 owing to the insertion of the delay circuit 1-22.

It is to be noted that the portions of the circuits 1-1 to 1-5 and the gate 1-10 in FIG. 3 are not shown in FIG. 5.

In addition, although the coaxial cable is employed for connection between the transceivers in the embodiment described above, the coaxial cable is not exclusive and other means may be employed, such as an optical fiber cable, space propagation by means of light or an electric wave.

As will be understood from the foregoing description, according to the invention, when a data processing equipment such as a terminal delivers a request-to-send signal to the transceiver corresponding thereto, since the transceiver sends back a clear-to-send signal after confirming that no contention will occur, there is no possibility of any contention when the data processing equipment sends data after receiving the clear-to-send signal. Accordingly, there is no need for resending due to contention, so that processing is simplified.

Moreover, according to the invention, if the transceiver once starts transmission of a carrier signal at the transmission request of the data processing equipment, since the transceiver continues transmitting the carrier signal even if contention occurs, a plurality of transceivers causing the contention do not abandon their sending rights, and in almost all the cases, one of the transceivers causing the contention obtains its sending right and the data from the corresponding data processing equipment can be sent. Accordingly, there is no possibility that the sending right is taken by another transceiver since transmission is stopped immediately after occurrence of contention, which takes place in the conventional method and device.

What is claimed is:

1. A method for data communication for use in a system having a common transmission line, a plurality of data processing equipment, and a respective transceiver connecting each of said plurality of data processing equipment to said common transmission line and adapted to send data from the corresponding data processing equipment to said common transmission line as data modulated on a carrier signal, as well as to send the data as modulated on a carrier signal from said common transmission line to said corresponding data processing equipment after demodulation, the method comprising:
    (1) a first step of sending a request signal, indicating a request to send data, from one data processing equipment to its associated transceiver;
    (2) a second step of sending from said associated transceiver a carrier signal having no data modulated thereon to said common transmission line in response to said request signal from said first data processing equipment if no carrier signal is detected on said common transmission line; and
    (3) a third step of applying to said one data processing equipment from its associated transceiver a signal granting permission to send data when a carrier signal from any of the other transceivers is not detected on said common transmission line by said associated transceiver during a given period of time after the start of sending of said carrier signal therefrom.

2. A method for data communication as defined in claim 1, further comprising a fourth step of suspending the sending of said carrier signal after the elapse of a period of time that can be set at will, when there is transmission from any of the other transceivers during the sending of said carrier signal.

3. A method for data communication as defined in claim 2, further comprising a fifth step of generating said signal granting a permission to send data, to said corresponding data processing equipment when there is no more transmission from any of the other transceivers prior to the suspension of sending of said carrier signal in said fourth step.

4. A device for data communication comprising a common transmission line, a plurality of data processing equipment, a respective transceiver connecting each of said plurality of data processing equipment to said common transmission line and adapted to send data as data modulated on a carrier signal from the corresponding data processing equipment to said common transmission line as well as to send data as modulated on a carrier signal from said common transmission line to said corresponding data processing equipment after demodulation, wherein each transceiver includes:
(1) first means for receiving a request signal, indicating a request to send data, from said corresponding data processing equipment;
(2) second means for sending a carrier signal having no data modulated thereon to said common transmission line in response to said request signal if no carrier signal is detected on said common transmission line; and
(3) third means for applying a signal indicating permission to send data to said corresponding data processing equipment when transmission from any of the other transceivers to said common transmission line is not detected during a given period of time after the start of sending of said carrier signal.

5. A device for data communication as defined in claim 4, wherein said transceiver further comprises fourth means for suspending the sending of said carrier signal after a period of time that can be set at will, when there is transmission from any of the other transceivers during the sending of said carrier signal.

6. A device for data communication as defined in claim 5, wherein said transceiver further comprises fifth means for granting permission to send data to said corresponding data processing equipment when there is no more transmission from any of the other transceivers prior to the suspension of sending of said carrier signal by said fourth means.

* * * * *